Figure 3:
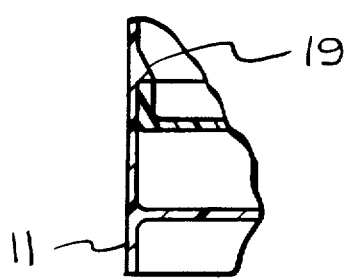

United States Patent [19]

Huldin et al.

[11] Patent Number: 4,674,635

[45] Date of Patent: Jun. 23, 1987

[54] COFFEE FILTER DISPENSER

[76] Inventors: Donald H. Huldin, 3538 Sylvan Glen Rd., Okemos, Mich. 48864; Janice C. Jordan, 6698 W. Weaver Ave., Littleton, Colo. 80123

[21] Appl. No.: 829,968

[22] Filed: Feb. 18, 1986

[51] Int. Cl.[4] ...................... B65D 83/08; B65D 85/62
[52] U.S. Cl. .................... 206/555; 206/449; 206/499; 221/47; 221/59
[58] Field of Search ............... 206/445, 554, 555, 556, 206/449, 499, 39.6; 221/47, 59; 211/51; 248/206.3

[56] References Cited

U.S. PATENT DOCUMENTS

| | | | |
|---|---|---|---|
| D. 148,736 | 2/1948 | Travis | 248/206.3 |
| D. 154,248 | 6/1949 | Durbin | 248/206.3 |
| 449,432 | 6/1893 | Lumley | 206/449 |
| 663,226 | 12/1900 | Carlen . | |
| 1,490,070 | 4/1924 | Korth | 221/47 |
| 1,682,933 | 9/1928 | Potts . | |
| 2,112,959 | 4/1938 | Harvey | 206/499 |
| 2,123,592 | 7/1938 | Torgeson et al. . | |
| 2,247,800 | 7/1941 | Broeren et al. | 221/61 |
| 2,592,255 | 4/1952 | Drees . | |
| 2,852,158 | 9/1958 | Jones et al. . | |
| 2,981,408 | 4/1961 | Gamble | 206/555 |
| 3,087,647 | 4/1963 | Heller . | |
| 3,092,379 | 6/1963 | Collier | 206/555 |
| 3,705,664 | 12/1972 | Ferris . | |
| 3,892,309 | 7/1975 | Coffey et al. | 206/449 |
| 4,121,726 | 10/1978 | Pemberton . | |
| 4,214,673 | 7/1980 | Heath . | |
| 4,266,665 | 5/1981 | Nelson | 206/449 |
| 4,586,632 | 5/1986 | Kuchler | 206/449 |

FOREIGN PATENT DOCUMENTS

| | | | |
|---|---|---|---|
| 2380895 | 10/1978 | France | 211/51 |
| 25040 | of 1904 | United Kingdom | 206/449 |
| 1181706 | 2/1970 | United Kingdom | 248/206.3 |

Primary Examiner—William Price
Assistant Examiner—Brenda J. Ehrhardt
Attorney, Agent, or Firm—Ian C. McLeod

[57] ABSTRACT

An apparatus for dispensing a single cup-shaped paper coffee filter from the top of a stack of filters 100 is described which includes a base 11 having upper and lower surface, 11a and 11b in which the upper surface is for splaying the stack of filters. A compression plate 13 supported by a pivot pin 14 is mounted adjacent the upper surface of the base for splaying the stack of coffee filters, and a backstop 17 is mounted adjacent to the compression plate on the top of the base for bending the stack of coffee filters enabling a single coffee filter to be dispensed from the stack. The base includes suction cups for mounting the apparatus to a hard surface while dispensing.

10 Claims, 6 Drawing Figures

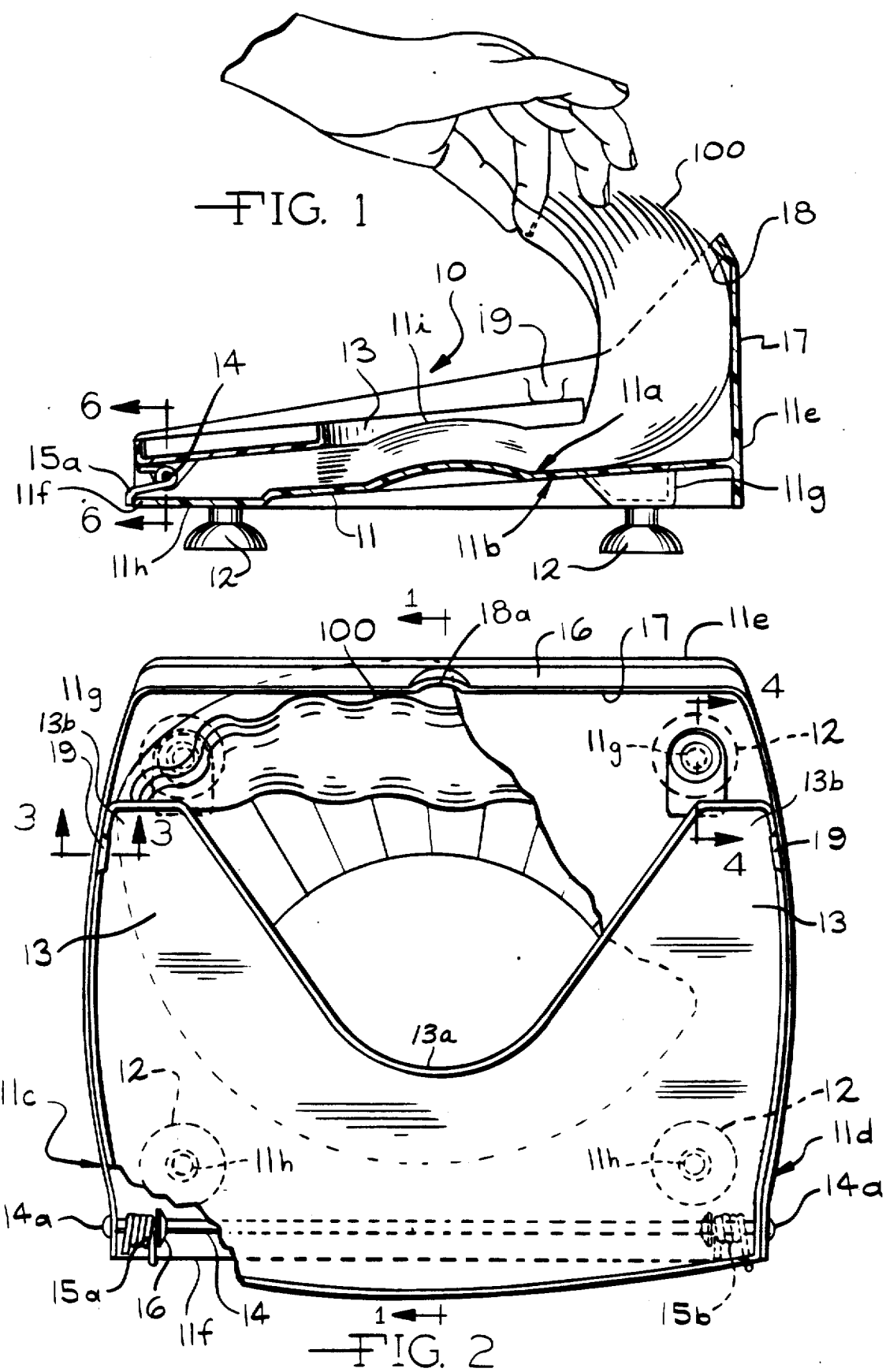

COFFEE FILTER DISPENSER

BACKGROUND OF THE INVENTION

1. Field of the Invention

The present invention relates to a coffee filter dispenser for dispensing a single coffee filter from a stack of filters. In particular the present invention relates to a coffee filter dispenser including a compression plate for splaying apart a stack of coffee filters which are mounted under the compression plate and also including a backstop which bends the stack of filters towards the compression plate in order to separate a single filter from the stack of filters.

2. Prior Art

U.S. Pat. No. 4,266,665 to Nelson (1981) describes a box shaped coffee filter dispenser with compression bars for separating and allowing manual removal of a single filter from the stack. The spaced apart compression bars distort the shape of the stack in a way which makes it difficult to remove a single coffee filter from the stack.

U.S. Pat. No. 4,214,673 to Heath et al (1980) describes a cup-shaped coffee filter dispenser having a hinge connected to an arm for dispensing one filter by friction from the stack of filters. U.S. Pat. No. 4,121,726 to Pemberton (1978) describes an apparatus having a lid with a lever which separates a single filter from the stack. These devices are not believed to provide for reliable separation of a single filter in the manner of a manual dispenser.

Other patents more distantly related to coffee filter dispensers are U.S. Pat. Nos. 3,705,664 to Ferris; 3,087,647 to Heller; 2,852,158 to Jones et al; 2,592,255 to Drees; 2,247,800 to Broeren et al; 2,123,592 to Torgeson et al; 1,682,933 to Potts; and 663,726 to Carlen.

OBJECTS

It is therefore an object of the present invention to provide a coffee filter dispenser which operates by compression and by bending of a stack of filters to splay them apart providing a more effective way to manually remove a single filter from a stack of filters. It is further an object of the present invention to provide a filter dispenser apparatus with suction cup legs attached to a base for securing the dispenser to a hard surface while dispensing. Further it is an object of the present invention to provide a coffee filter dispenser which is simple and economical to construct. These and other objects will become increasingly apparent by reference to the following description and the drawings.

GENERAL DESCRIPTION

The present invention relates to a dispensing apparatus for a stack of cup-shaped coffee filters having a bottom connected to vertically corrugated sides leading to a lip where said lip is above the bottom in said apparatus and wherein an uppermost filter is to be manually removed from said apparatus which comprises: a base having an upper and lower surface wherein said upper surface provides a horizontal dispensing platform for supporting said bottom of said stack of filters; a compression plate having a rear and a front portion with said rear portion pivotably mounted on said upper surface of said platform, wherein the compression plate splays the stack of filters from the stack against the upper surface of the base to facilitate manual removal of a single uppermost filter from said stack.

The present invention further relates to a dispensing apparatus for a stack of cup-shaped coffee filters having a bottom connected to vertically corrugated sides leading to a lip where said lip is above said bottom in said apparatus and wherein an uppermost filter is to be manually removed from said apparatus which comprises: a base having an upper and lower surface wherein said upper surface provides a horizontal dispensing platform for supporting said bottom of said stack of filters; a compression plate having a rear and a front portion with said rear portion pivotably mounted on said upper surface of said platform wherein the compression plate has a U-shaped indentation at said front portion over said stack of filters to splay said stack of filters manually from the stack against said upper surface of said base; and a holding means provided between said base and said compression plate which urges said compression plate and base together for splaying said stack of coffee filters wherein said uppermost filter is to be manually removed from said stack of filters.

The present invention also relates to a dispensing apparatus for a stack of cup-shaped coffee filters having a bottom connected to vertically corrugated sides leading to a lip where said lip is above said bottom in said apparatus and wherein an uppermost filter is to be manually removed from said apparatus which comprises: a base having an upper and lower surface wherein said upper surface provides a horizontal dispensing platform for supporting said bottom of said stack of filters; a compression plate having a front and rear portion with said rear portion pivotably mounted on said upper surface of said platform so that the front portion splays said stack of coffee filters towards said upper surface of said base; and a backstop mounted on said upper surface of said base adjacent to said front portion of said compression plate having a projecting surface from an upper end of said backstop for bending an edge of said stack of filters away from the backstop and towards said compression plate.

IN THE DRAWINGS

The aforementioned advantages and objects of the invention will be appreciated from the following description and accompanying drawings wherein:

FIG. 1 is a side view of the filter dispensing apparatus of the present invention, particularly illustrating a compression plate 13 and backstop 17 mounted on a base 11 to splay a stack of coffee filters 100 for manual removal and also illustrating legs 11g mounted to the base.

FIG. 2 is a top view of the filter dispensing apparatus of the present invention, particularly illustrating the backstop 17 positioned adjacent to the compression plate 13 for bending the coffee filters 100 and also illustrating the pivotal mounting of the compression plate to the base 11.

FIG. 3 is a partial cross sectional view along line 3—3 of FIG. 2 particularly illustrating a stop pin 19 which is internal with the base 11 for stopping upward movement of the compression plate 13.

Figure 4:
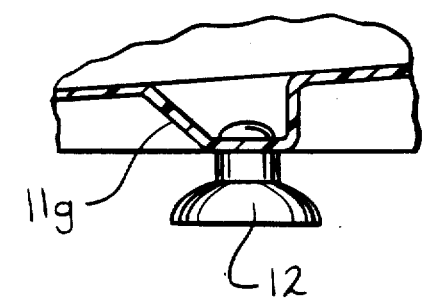

FIG. 4 is a cross sectional view along line 4—4 of FIG. 2 particularly illustrating a leg 11g connected to the base 11 as shown in FIG. 1.

Figure 5:
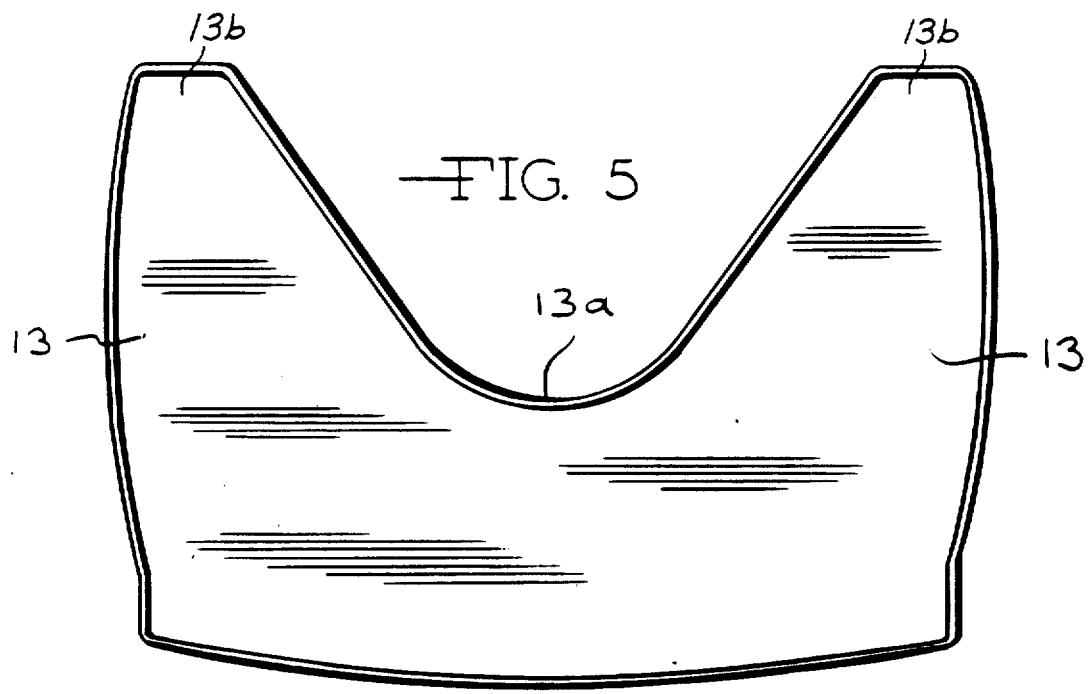

FIG. 5 is a top view of the compression plate 13 alone as shown in FIGS. 1 and 2.

Figure 6:
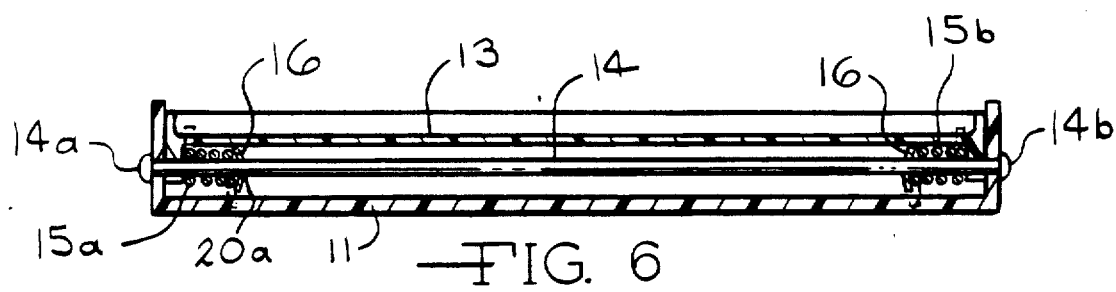

FIG. 6 is a longitudinal cross-sectional view along line 6—6 of FIG. 1 particularly illustrating a pivot pin 14 which is mounted between the compression plate 13 and base 11.

SPECIFIC DESCRIPTION

Referring to FIGS. 1 through 6, a coffee filter dispenser designated by reference numeral 10 is adapted for removing a single coffee filter from a stack 100. The dispenser 10 includes a body member or a base 11 having upper and lower surfaces 11a and 11b, opposed sides 11c and 11d and front and rear sides 11e and 11f. The base 11 is of a generally rectangular lightweight construction. Four suction cups 12 are mounted to the bottom of the base 11b on integral legs 11g and 11h for holding the coffee filter dispenser 10 in place while in use. An elevated portion 11i aids in raising the filters to facilitate splaying them apart. A compression plate 13, shown in FIGS. 1 and 2, is mounted to the upper surface 11a of the base 11 for splaying the stack of coffee filters 100. The compression plate 13 is secured to the base 11 by a pivot pin 14 illustrated in FIG. 2. The pivot pin 14 supports a pair of coiled springs 15a and 15b serviced by stop washers 16 mounted on pivot pin 14. The pivot pin 14 is mounted between the compression plate 13 and the top of the base 11a and is secured in place by heads 14a on pin 14. A backstop 17 having a protruding lip 18 is mounted adjacent the compression plate 13 on the upper surface 11a of the base 11. The lip 18 has a recess 18a which aids in splaying the filters 100 with a finger. The protruding lip 18 bends the stack of coffee filters 100 thereby enabling a single coffee filter to be removed.

FIG. 3 also shown in FIG. 2 illustrates a stop pins 19 which is integral with the upper surface 11a of the base 11 for holding the compression plate 13 against the stack of coffee filters 100 and preventing upward movement of the compression plate 13. The sides 11c and 11e of the base 11 are flexible and move away from the stop pins 19 as shown in FIG. 3 to allow the compression plate 13 to be pressed on a stack 100 of filters or to allow the compression plate 13 rotated on pin 14 to allow insertion of the stack filters 100 on the upper surface 11a of the base 11. FIG. 4 shows the details of the suction cup 12 mounted on leg 11g which secures the coffee filter dispenser 10 to a surface while dispensing. The compression plate 13 as shown in FIG. 5 has a U-shaped recess 13a with arms 13b having ends which splay the circumference of a stack of coffee filters 100. The recess 13a is around the elevated portion 11i and aids in splaying the filters 100 apart.

The coffee filter dispenser 10 of the present invention functions by placing a stack of coffee filters 100 under the compression plate 13. The stack of coffee filters 100 are splayed by the pressure that is applied to the compression plate 13 by the springs 15a and 15b. The backstop 16 with the protruding lip 17 bends the splayed coffee filters 100 towards the compression plate 13 enabling a single coffee filter A to be removed or dispensed from the stack 100 as shown in FIG. 1.

The material used to construct the coffee filter dispenser 10, specifically the base 11 compression plate 13 and backstop 16 is of a plastic material preferably vacuum molded PVC. Vacuum molded PVC provides ease of production and is light in weight.

The compression plate 13 of the present invention can function without the use of the springs 15a and 15b. For instance a hand or a rubber band around the base 11 and compression plate applying the pressure to the compression plate and the stack of coffee filters 100 would yield the same results. Also the backstop 17 need not be used; however, it is preferred.

It is intended that the foregoing description be only illustrative of the present invention and that the present invention be limited only by the hereinafter appended claims.

We claim:

1. A dispensing apparatus for a stack of cup-shaped coffee filters having a bottom connected to vertically fluted sides leading to a lip around a circumference of the stack of filters where the lip is above the bottom of the stack when the stack is mounted in the apparatus and wherein an uppermost filter is to be manually removed from the apparatus which comprises:
   (a) a base having an upper and lower surface wherein the upper surface provides a horizontal dispensing platform for supporting the bottom of the stack of filters; and
   (b) a compression plate having a rear portion and a front portion with a recess in the front portion of the compression plate over the stack of filters and with the rear portion of the plate including means for pivotably mounting said plate on the upper surface of the platform and with arms extending from the front portion of the compression plate with the recess between the arms, said arms having ends which engage opposed portions of the lip of the stack of filters, means including the arms to splay the stack of filters against the upper surface of the base to facilitate manual removal of a single uppermost filter from the stack.

2. A dispensing apparatus for a stack of cup-shaped coffee filters having a bottom connected to vertically fluted sides leading to a lip around a circumference of the stack of filters where the lip is above the bottom of the stack when the stack is mounted in the apparatus and wherein an uppermost filter is to be manually removed from the apparatus which comprises:
   (a) a base having an upper and lower surface wherein the upper surface provides a horizontal dispensing platform for supporting the bottom of the stack of filters;
   (b) a compression plate having a rear portion and a front portion with the rear portion of the compression plate having means to pivotably mount said plate on the uppe surface of the platform wherein the compression plate has a U-shaped recess in the front portion of the compression plate over the stack of filters with arms on either side of the indentation extending from the front portion of the compression plate, said arms having ends which engage opposed portions of the lip of the stack of filters to splay the stack of filters against the upper surface of the base; and
   (c) a holding means provided between the base and the compression plate which urges the compression plate and base together for splaying the stack of coffee filters wherein the uppermost filter is to be manually removed from the stack of filters.

3. A dispensing apparatus for a stack of cup-shaped coffee filters having a bottom connected to vertically fluted sides leading to a lip around a circumference of the stack of filters where the lip is above the bottom of the stack when the stack is mounted in the apparatus and wherein an uppermost filter is to be manually removed from the apparatus which comprises:
   (a) a base having an upper and lower surface wherein the upper surface provides a horizontal dispensing platform for supporting the bottom of the stack of filters;

(b) a compression plate having a front and rear portion with a recess in the front portion of the plate over the stack of filters and with the rear portion of the plate having means to pivotably mount said plate on the upper surface of the platform, means for splaying the stack of filters including arms extending from the front portion of the compression plate with the recess between the arms, said arms having ends which engage opposite portions of the lip of the stack of filters so that the front portion splays the stack of coffee filters towards the base; and (c) a backstop mounted on the upper surface of the base adjacent to the arms on the front portion of the compression plate having a projecting surface from an upper end of the backstop for bending an edge of the stack of filters away from the backstop and towards the arms on the the compression plate.

4. The dispensing apparatus according to claim 3 wherein the base has a plurality of suction cup legs attached to the lower surface for securing the apparatus while dispensing.

5. The dispensing apparatus according to claim 3 wherein the recess in the front portion of the compression plate is U shaped between the arms which compress the lip of the stack of filters.

6. The dispensing apparatus according to claim 3 wherein said means for splaying said stack of filters includes a spring means provided between the base and the compression plate to urge the base and compression plate together to splay the stack of coffee filters.

7. The dispensing apparatus according to claim 6 wherein said spring means is mounted on the compression plate and the base on a longitudinal axis where the base and compression plate are pivotably mounted.

8. The dispensing apparatus according to claim 3 wherein said backstop has a protruding lip as the projecting surface for bending the lip of the stack of coffee filters towards the arms.

9. The dispensing apparatus according to claim 3 whrein the base and the backstop are integrally molded of a plastic material.

10. The dispensing apparatus of claim 9 wherein the plastic material is vacuum molded PVC.

* * * * *

UNITED STATES PATENT AND TRADEMARK OFFICE
CERTIFICATE OF CORRECTION

PATENT NO. : 4,674,635

DATED : June 23, 1987

INVENTOR(S) : Donald H. Huldin and Janice C. Jordan

It is certified that error appears in the above-identified patent and that said Letters Patent are hereby corrected as shown below:

Column 3, line 32 after "illustrates", "a" should be deleted.

Column 4, line 46 "uppe" should be --upper--.

Column 4, lines 49 and 50 "indentation" should be --recess-.

Signed and Sealed this

Twenty-first Day of June, 1988

Attest:

DONALD J. QUIGG

Attesting Officer

Commissioner of Patents and Trademarks